UNITED STATES PATENT OFFICE.

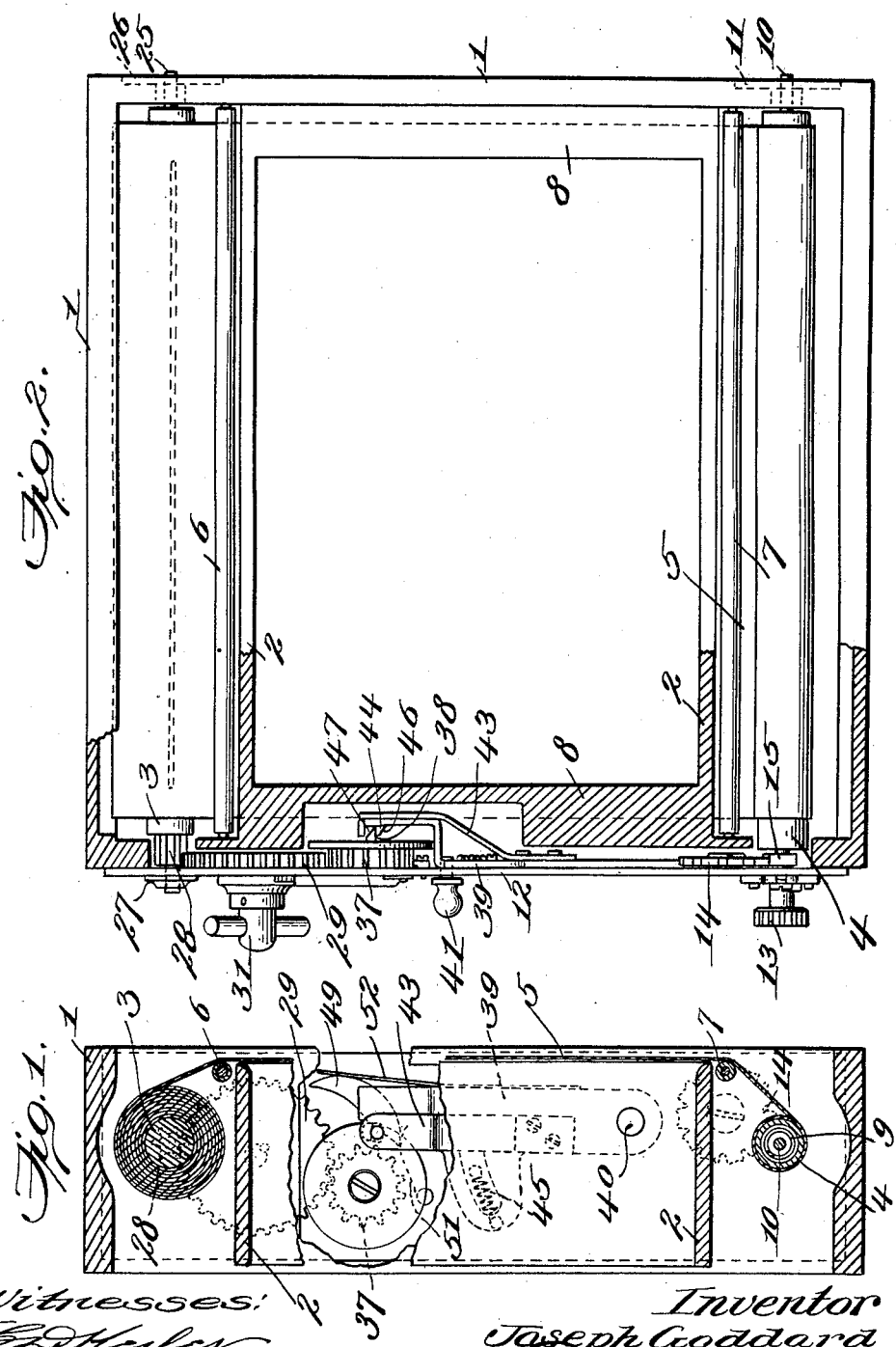

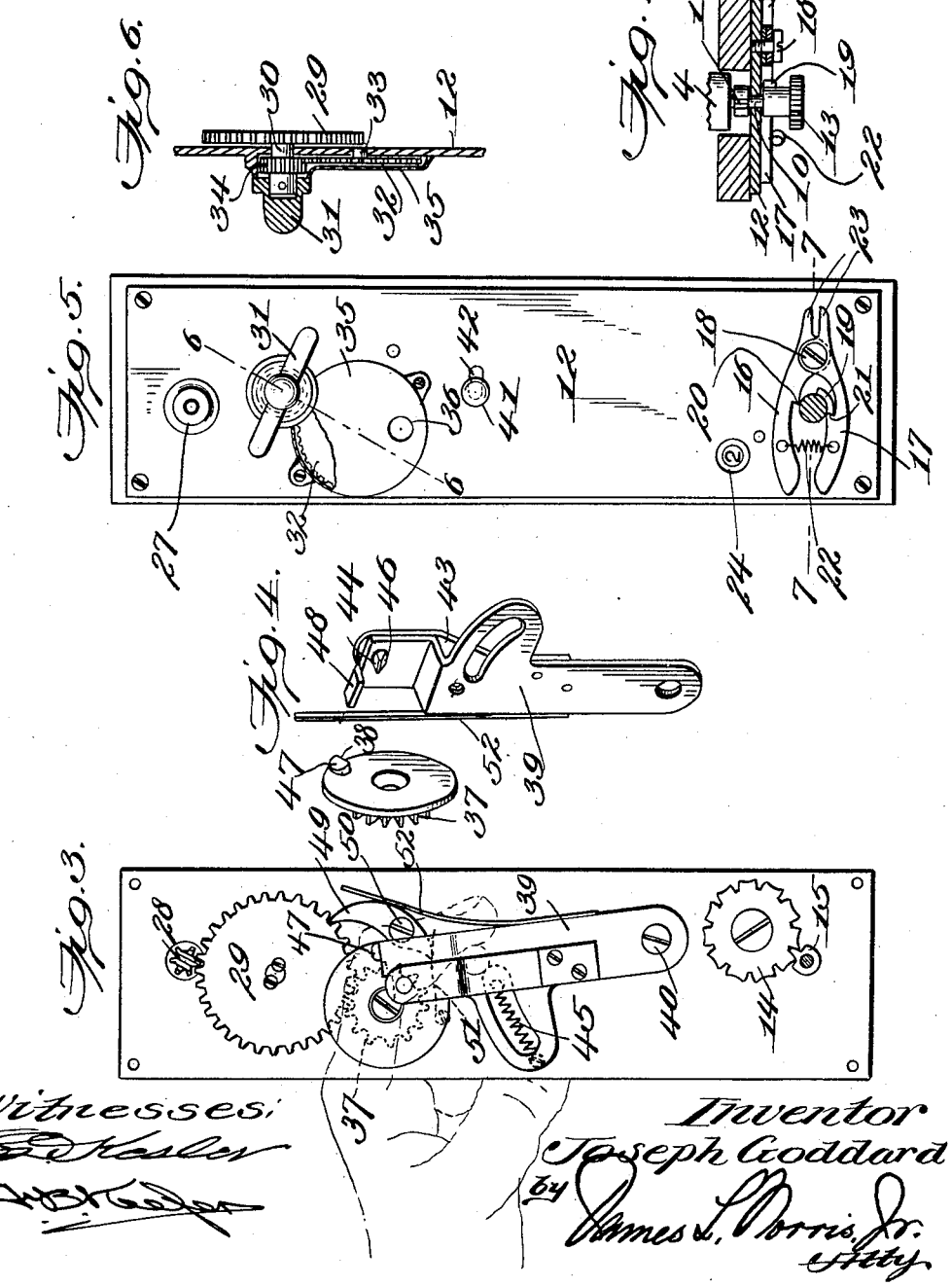

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

PHOTOGRAPHIC SHUTTER.

1,009,501.  Specification of Letters Patent.  Patented Nov. 21, 1911.

Application filed February 25, 1911. Serial No. 610,756.

*To all whom it may concern:*

Be it known that I, JOSEPH GODDARD, a citizen of the United States, residing at Rochester, in the county of Monroe and State of New York, have invented new and useful Improvements in Photographic Shutters, of which the following is a specification.

My present invention relates to improvements in shutters for photographic cameras but more particularly to the class employing a flexible curtain provided with the desired exposure apertures together with devices for actuating and controlling the movements of the curtain in effecting the different exposures, and the primary object of this invention is to provide a simple and reliable shutter of the class above described which may be operated with facility to produce the desired exposures and as the shutter contains but few parts, it is not liable to get out of order.

A further object of the invention is to provide an improved lock for the shutter-actuating or tension spring whereby the strength or power of this spring and consequently the speed of movement of the curtain and the duration of the exposures can be regulated more perfectly than has been possible with devices of this kind as heretofore proposed and, moreover, the operation of winding or setting the spring may be accomplished easily.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a vertical section of a photographic shutter constructed in accordance with one embodiment of my invention; Fig. 2 represents a front elevation of the shutter, the left hand side thereof being shown in section to illustrate more clearly the mechanism thereof; Fig. 3 is a detail view of the mechanism for controlling the movements of the shutter curtain, the escapement being shown in actuated position; Fig. 4 is a detail perspective view of the escapement and the coöperating controlling gear forming parts of the shutter mechanism; Fig. 5 represents an exterior end elevation of the shutter, parts thereof being shown in section; Fig. 6 represents a section on the line 6—6 of Fig. 5; and Fig. 7 represents a section on the line 7—7 of Fig. 5.

Similar parts are designated by the same reference characters in the several views.

In the present instance the shutter embodies a casing 1 which may be of any suitable construction whereby the shutter may be placed in operative relation to a camera, the construction of the shutter in the present instance being such as to adapt it to be so applied to the camera that the intermediate portion of the curtain lies substantially in the focal plane of the camera lens. The partitions 2 separate the ends of the shutter casing from the intermediate portion thereof, the space between the partitions 2 corresponding to the exposure opening. The usual winding roller 3 is mounted in one end of the casing and the usual tension roller 4 is mounted in the opposite end of the casing, and the flexible curtain 5 has its opposite ends attached to these respective rollers, the intermediate portion of the curtain extending across the exposure opening defined by the partitions 2 and to minimize friction between the curtain and the casing, a pair of guide rollers or idlers 6 and 7 are preferably journaled in the casing immediately adjacent to the rear ends of the partitions 2, as shown. The curtain 5 may be provided with the usual graduated apertures for so called instantaneous exposures of different durations and also a full-sized aperture to permit so called time exposures to be made, these several apertures in the curtain being separated by opaque portions of the curtain, each of these portions being capable of completely covering the sensitized medium between the periods of the different exposures. To prevent leakage of light past the longitudinal edges of the curtain when one of the opaque portions thereof is in operative position, inwardly extending flanges 8 are provided between the partitions 2, the curtain passing in rear of these flanges and lying in close relation thereto.

As is usual in shutters of this class, the different exposures may be made by successive movements of the curtain in one direction. These movements of the curtain are accomplished as usual by the tension roller 4 acting under the influence of its spring 9. One end of this spring is attached to the roller and its opposite end is attached to the usual shaft 10, the roller 4 being freely revoluble with respect to the shaft 10 and having a normal tendency to wind the curtain under the influence of the spring 9, and the shaft 10 is journaled at one end in a bearing or bushing 11 fitted in one side of the shutter casing while its opposite end is journaled in a plate 12 which is applied to the opposite side of the shutter casing. One end of the shaft 10, preferably the end journaled in the plate 12, is provided with a knob or its equivalent 13 whereby the shaft 10 may be conveniently rotated to wind the spring attached thereto. To prevent initial winding of the spring in the wrong direction and to prevent overwinding and consequent breakage of the spring, the usual Geneva stop is used, the toothed wheel 14 forming a part of this stop being rotatably mounted upon the inner side of the plate 12 and the coöperating tooth 15 being fixed to the shaft 10 at the inner side of the plate 12.

The present invention provides an improved lock for retaining the spring at the different desired tensions. This lock in the present instance consists of a pair of dogs 16 and 17 which are mounted on a common pivot 18 preferably attached to the plate 12 at a point adjacent to the shaft 10. The axis of the spring shaft 10 passes between the dogs and a part attached to the shaft coöperates with the dogs whereby the latter serve to hold the shaft in the different desired positions. In the present instance the knob 13 is formed with a locking projection 19 which is adapted to engage either of the locking projections 20 and 21 formed at the inner sides of the respective dogs. Means is provided for yieldably pressing the dogs toward one another whereby the projections thereon will engage the locking projection 19. Preferably a tension spring 22 is provided the ends of which are attached to the respective dogs, and the intermediate portion of this spring may be coiled to afford the necessary elasticity. These dogs are capable of separating a distance that will be just sufficient to permit the projection on one dog to disengage from the locking projection 19, the projection on the opposed dog being in position to engage the locking projection 19 immediately after it has been released. For this purpose the ends of the dogs beyond the pivot 18 are formed as a pair of limiting stops 23 which will engage one another and limit the separation of the dogs. The dogs are arranged at opposite sides of the axis of the shaft 10 and when the shaft 10 is rotated in a direction to wind the spring, the dogs will be alternately deflected to permit such winding. When the spring has been wound to the desired point, the projection 19 will engage one of the dogs and the latter will thereby hold the spring at the desired tension. When, however, it is desirable to reduce or relieve the tension upon the spring, it is only necessary to alternately disengage the dogs from the locking projection 19, the spring shaft being thereby permitted to unwind. The construction just described facilitates the winding of the spring as it may be wound by successive half revolutions and, moreover, the tension of the spring may be more accurately or precisely adjusted according to the desired durations of exposures, as the dogs will hold the spring at a greater number of adjustments than has been possible with devices as heretofore proposed which permitted the spring to be adjusted only by degrees determined by complete revolutions of the spring shaft. To indicate the different tensions upon the spring, the plate 12 may be formed with a sight aperture 24 and the outer face of the toothed wheel 14 of the Geneva stop may be provided with suitably placed characters which are exposed through the sight aperture.

The winding roller 3 is mounted to turn with a shaft 25 one end of which is journaled in a bearing or bushing 26 fitted in one side of the shutter casing, and the opposite end of the shaft is journaled in a bearing 27 formed on or attached to the plate 12 and a pinion 28 is fixed to the shaft between the plate 12 and the adjacent end of the winding roller 3. The plate 12 serves as a carrier or support for the shutter-controlling mechanism. In the present instance a rewinding gear 29 is fixed to a stud shaft 30, this shaft 30 being journaled in the plate 12 and has a suitable handle 31 fixed thereto whereby the winding roller 3 can be rotated to reset the curtain, the gear 29 coöperating with the pinion 28 which turns with the winding roller. In order to enable the operator to determine what particular portion of the curtain will pass the field of the lens upon the next release of the curtain, the usual indicator may be provided, such consisting in the present instance of an indicator wheel 32 which has a journal 33 fitted into the plate 12 to form a bearing therefor, and this wheel is in the form of a gear which meshes with a pinion 34 which is attached to and rotates with the stud shaft 30 of the rewinding gear 29. In the present instance, this indicator wheel is mounted on the exterior side of the plate 12 and for this reason it may be covered by a casing 35 which has a sight aperture 36 through which the characters on the indicator wheel may be observed.

The unwinding of the curtain from the winding roller under the action of the spring 9 is controlled according to the present invention by a gear 37 which is revolubly mounted at the inner side of the plate 12 and coöperates with the rewinding gear 29. The exposure controlling gear 37 has a diameter which is preferably a fraction of the diameter of the rewinding gear 29 and carries a relatively large disk which is provided with a laterally offset projection 38 through the medium of which the unwinding of the curtain is controlled by the aid of an escapement. This escapement in the present embodiment of the invention comprises an arm 39 which is pivoted at 40 to the inner side of the plate 12 whereby this arm is capable of a rocking or swinging movement in a plane parallel to the plane of rotation of the gear 37, and this arm may be operated by means of a knob or projection 41 which extends through a slot 42 in the plate 12 and is exposed at the outer side thereof. The arm 39 carries a spring 43 and a projection 44 is fixed to the spring and lies in the path of the projection 38 on the exposure controlling gear 37 when the arm 39 is in normal position, this arm being held in such position by means of a retracting spring 45. The projection 44, however, is capable of being deflected in a direction transverse to the plane of rotation of the gear wheel 37 owing to its being attached to the spring 43, and this operation takes place while the curtain is being wound upon the roller 3. During the rewinding of the curtain, the projection 44 acts as a latch, it being provided for this purpose with a beveled surface 46 which is arranged to coöperate with a correspondingly beveled surface 47 on the projection 38. During the operation of the curtain to effect the different exposures, however, this projection 44 is held in the path of the projection 38 by its spring 43. Movement of the arm 39 of the escapement into the position shown in Fig. 3 will carry the projection 44 out of engagement with the projection 38 of the exposure-controlling gear 37, the latter being thereby free to rotate and will permit movement of the curtain to effect an exposure. While the arm 39 of the escapement is in actuated position as represented in Fig. 3, an abutment 48 will be presented to the projection 38, the surface of this abutment sloping slightly toward the arresting surface of the projection 44 so that when the abutment is encountered by the projection 38, rotation of the gear 37 will be arrested prior to the engagement of the projection 38 with the projection 44. The abutment 48 is spaced above the projection 44 a distance sufficient to accommodate the projection 38 when the escapement arm 39 is shifted into a position to release the projection 38. During the rewinding of the curtain, the abutment 48 is clear of the circle in which the projection 38 moves, as shown clearly in Fig. 1.

In order to prevent recoil of the curtain after each exposure, I preferably employ a non-rebounding stop for the rewinding gear 29, this stop in the present instance being in the form of a pawl 49 which is pivoted at 50 to the inner side of the plate 12, and this pawl is arranged to coöperate with the peripheral gear teeth of the wheel 29 so as to prevent backward rotation of this wheel 29 immediately after each exposure operation of the cutain. Normally, the pawl 49, however, is disengaged from the wheel 29 and is held in such position by a relatively weak spring 51 so that this pawl will not interfere with a rewinding or resetting of the curtain. However, at each operation of the escapement to effect an exposure, this pawl will be yieldably pressed into engagement with the peripheral teeth of the wheel 29 by a spring 52 which is attached to or otherwise operated by the escapement arm 39, and it is of a strength sufficient to overpower the pawl-retracting spring 51. The pawl 49 will thereby be held in coöperative relation with the rewinding wheel 29 while the escapement is in actuated position as shown in Fig. 3, but when the escapement is returned to normal position, the power of the spring 52 will be diminished to such a degree as to enable the spring 51 to retract the pawl from the teeth of the wheel 29.

In operation, the curtain-actuating spring is wound or set so that it possesses a tension that will carry the selected exposure aperture in the curtain across the field of the lens at the desired speed. To effect the exposure, it is only necessary to shift the escapement arm, as previously described, the projection thereon which controls the operation of the curtain being thereby carried clear of the coöperative projection on the exposure-controlling gear and permitting the latter to revolve, the curtain unwinding from the winding roller and winding upon the tension roller under the influence of the curtain-actuating spring, and in that manner, the exposure aperture in the curtain traverses the field of the lens and effects exposure of the sensitized medium.

The curtain may be reset by reverse rotation of the rewinding gear, the non-rebounding stop and the escapement permitting such to be accomplished while the escapement is in normal position.

I claim as my invention:—

1. In a photographic shutter, the combination of an exposure-controlling curtain, winding and tension rollers coöperative therewith, a curtain-controlling member, and an escapement having a projection thereon coöperative with said member to arrest its movement after each exposure and having a yieldable connection with the escapement which allows such projection to move relatively to the escapement to permit reverse motion of said member during resetting of the curtain.

2. In a photographic shutter, the combination of an exposure-controlling curtain, winding and tension rollers coöperative therewith, a curtain-controlling member, and an escapement movable relatively to said member and carrying a projection arranged to coöperate with said member to arrest its movement after each exposure and having a yieldable connection with the escapement which allows such projection to move transversely of the direction of movement of the escapement to permit reverse motion of said member during resetting of the curtain.

3. In a photographic shutter, the combination of an exposure-controlling curtain, winding and tension rollers coöperative therewith, a member connected to operate with the curtain and provided with an exposure-controlling projection, and an escapement carrying a projection coöperative with the projection on said member to arrest movement of the latter after each exposure and having a yieldable connection with the escapement which allows such projection to move laterally of the path of movement of the projection on said member to permit reverse motion thereof and resetting of the curtain.

4. In a photographic shutter, the combination of an exposure-controlling curtain, winding and tension rollers coöperative therewith, a gear operatively connected to the winding roller and carrying an exposure-controlling projection, and an escapement movable in substantially the plane of rotation of said gear and carrying a projection which is coöperative with the projection on said gear to arrest movement thereof after each exposure, said projection having a connection with the escapement which allows such projection to move laterally of the plane of rotation of said gear to permit reverse motion thereof during resetting of the curtain.

5. In a photographic shutter, the combination of an exposure-controlling curtain, winding and tension rollers coöperative therewith, a gear operatively connected to the winding roller and carrying a projection, and an escapement carrying a projection arranged to coöperate with the projection on said gear to arrest the motion of the latter after each exposure and having a connection with the escapement which allows such projection to move laterally of the plane of rotation of said gear, said projections having beveled surfaces to cause deflection of the laterally movable projection during reverse motion of the gear and resetting of the curtain.

6. In a photographic shutter, the combination of an exposure-controlling curtain, winding and tension rollers coöperative therewith, a gear operatively connected to the winding roller and carrying a projection, an escapement, and a spring fixed to and carried by the escapement and provided with a projection, said projection being arranged to coöperate with the projection on said gear to arrest rotation of the latter after each exposure, said spring permitting lateral deflection of its projection when said gear is rotated in a reverse direction to reset the curtain, the escapement being movable relatively to the gear to disengage the projection on the escapement from the projection on the gear.

7. In a photographic shutter, the combination of an exposure-controlling curtain, winding and tension rollers coöperative therewith, a gear operatively connected to the winding roller and carrying a projection, an escapement movable transversely of the axis of said gear and having a projection thereon arranged to coöperate with the projection on said gear to arrest rotation of the latter after each exposure, and an abutment also carried by the escapement and having a face sloping toward the projection on the escapement, said abutment being arranged to be engaged by the projection on said gear preliminarily to the engagement of the projection on the gear with the projection on the escapement.

8. In a photographic shutter, the combination of an exposure-controlling curtain, winding and tension rollers coöperative therewith, a gear wheel operatively connected to the winding roller, an escapement, coöperative projections between the escapement and said gear wheel for arresting the motion of the curtain after each exposure, a non-rebounding stop controlled by but capable of movement relatively to the escapement and coöperative with the teeth of said gear wheel to prevent reverse motion of the latter after each exposure.

9. In a photographic shutter, the combination of an exposure-controlling curtain, winding and tension rollers coöperative therewith, a gear wheel operatively connected to the winding roller, an escapement and coöperating projection between it and said gear wheel for controlling the operations of the curtain, a pawl arranged to coöperate with the teeth of said gear wheel to prevent reverse motion of the latter after each exposure, and means for setting said pawl in operative relation to the gear wheel after each releasing operation of the escapement.

10. In a photographic shutter, the combination of an exposure-controlling curtain, winding and tension rollers coöperative therewith, a gear wheel operatively connected to the winding roller, an escapement and coöperating projection between it and said gear wheel for controlling the exposing movements of the curtain, a pawl adapted to coöperate with the teeth of said gear wheel to prevent reverse motion thereof after each exposure, said pawl being normally disengaged from said gear wheel, and a spring operative by the escapement as the latter moves into actuated position for setting the pawl in coöperative relation with said gear wheel.

11. In a photographic shutter, the combination of an exposure-controlling curtain, a winding roller attached to one end of the curtain, and a tension roller attached to the opposite end thereof, a spring for actuating the tension roller, and a lock for retaining the spring at different desired tensions, embodying a shaft coöperative with the spring and having a projection turnable therewith, and a pair of dogs arranged at opposite sides of the axis of said shaft and having projections adapted to coöperate with the projection on the shaft.

12. In a photographic shutter, the combination of an exposure-controlling curtain, winding and tension rollers coöperative therewith, a spring for actuating the tension roller, a winding shaft for the spring, and a lock for retaining the spring under tension comprising a projection turnable with the shaft, a pair of relatively movable dogs having opposed locking projections arranged at opposite sides of the axis of said shaft, a spring for retaining the projection on either dog in engagement with the projection on the shaft, and means for limiting the relative separation of the dogs.

13. In a photographic shutter, the combination of an exposure-controlling curtain, winding and tension rollers coöperative therewith, a spring for actuating the tension roller, a winding shaft for said spring, and a lock for retaining the spring at different tensions, comprising a pair of dogs mounted on a common pivot and having opposed projections arranged at opposite sides of the axis of said shaft, a projection turnable with the shaft and adapted to alternately engage the projections on said dogs, a spring connecting the dogs and operative to hold them in coöperative relation with the projection on the shaft, and lugs on the dogs for limiting the separation of the projections thereon.

14. In a photographic shutter, the combination of an exposure-controlling curtain, winding and tension rollers coöperative therewith, an actuating spring for the tension roller, a winding shaft for said spring, and a lock for holding the spring at different tensions comprising a pair of relatively movable dogs having opposed locking projections, a part on said shaft having a locking projection coöperative with the locking projections on said dogs, means normally acting to hold both dogs in coöperative relation with the locking projection on the shaft, and limiting stops which permit the dogs to move bodily and also relatively to one another to a limited degree.

In testimony whereof I have hereunto set my hand in presence of two subscribing witnesses.

JOSEPH GODDARD.

Witnesses:
 GEO. GAGMIER,
 W. C. SEWARD.

---

Copies of this patent may be obtained for five cents each, by addressing the "Commissioner of Patents, Washington, D. C."